(12) United States Patent
Kunkel et al.

(10) Patent No.: US 6,619,737 B2
(45) Date of Patent: Sep. 16, 2003

(54) SEAT MODULE FOR A VEHICLE SEAT WHICH CAN BE ACTIVELY VENTILATED

(75) Inventors: Joachim Kunkel, Stuttgart (DE); Karl Pfahler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/860,508

(22) Filed: May 21, 2001

(65) Prior Publication Data

US 2002/0003362 A1 Jan. 10, 2002

(30) Foreign Application Priority Data

May 19, 2000 (DE) .................................. 100 24 879

(51) Int. Cl.[7] .............................................. A47C 31/00
(52) U.S. Cl. ............................ 297/180.14; 297/180.12; 5/652.2
(58) Field of Search ................. 297/180.13, 180.14, 297/180.1, 452.42, 452.44, 452.48, 452.49, 180.11; 5/652.1, 652.2, 726, 724, 653

(56) References Cited

U.S. PATENT DOCUMENTS

| | | | | |
|---|---|---|---|---|
| 3,807,800 A | * | 4/1974 | Morrison et al. | 297/452.1 |
| 5,597,200 A | * | 1/1997 | Gregory et al. | 297/180.13 |
| 5,902,014 A | | 5/1999 | Dinkel et al. | 297/452.43 |
| 5,934,748 A | * | 8/1999 | Faust et al. | 297/180.12 |
| 6,019,420 A | | 2/2000 | Faust et al. | 297/180.14 |
| 6,027,171 A | * | 2/2000 | Partington et al. | 297/452.18 |
| 6,145,925 A | * | 11/2000 | Eksin et al. | 297/180.14 |
| 6,179,086 B1 | * | 1/2001 | Bansemir et al. | 181/292 |
| 6,186,592 B1 | * | 2/2001 | Orizaris et al. | 297/180.12 |
| 6,196,627 B1 | * | 3/2001 | Faust et al. | 297/180.14 |
| 6,206,465 B1 | | 3/2001 | Faust et al. | 297/180.14 |
| 6,224,150 B1 | * | 5/2001 | Eksin et al. | 297/180.1 |

FOREIGN PATENT DOCUMENTS

| | | |
|---|---|---|
| DE | 196 28 698 C1 | 10/1997 |
| DE | 197 45 521 A1 | 4/1999 |
| DE | 198 04 284 A1 | 8/1999 |

* cited by examiner

Primary Examiner—Peter M Cuomo
Assistant Examiner—Stephen Vu
(74) Attorney, Agent, or Firm—Crowell & Moring LLP

(57) ABSTRACT

A seat module intended for a vehicle seat is designed as a seat cushion or backrest and can be actively ventilated. The seat module includes a cushion which has a lower foam layer impermeable to air, a central air-guiding layer made from a knitted fabric, and an air-permeable upper foam layer. The cushion is covered with a cushion cover and is divided by tacking into a face area and two side areas, which extend in the longitudinal direction. A cushion carrier accommodates the cushion. To improve the quality of the module for sitting comfort and long-term stability while achieving low manufacturing costs, the air-guiding layer rests on the lower foam layer in the face area of the cushion and directly on the cushion carrier in the side area of the cushion.

23 Claims, 1 Drawing Sheet

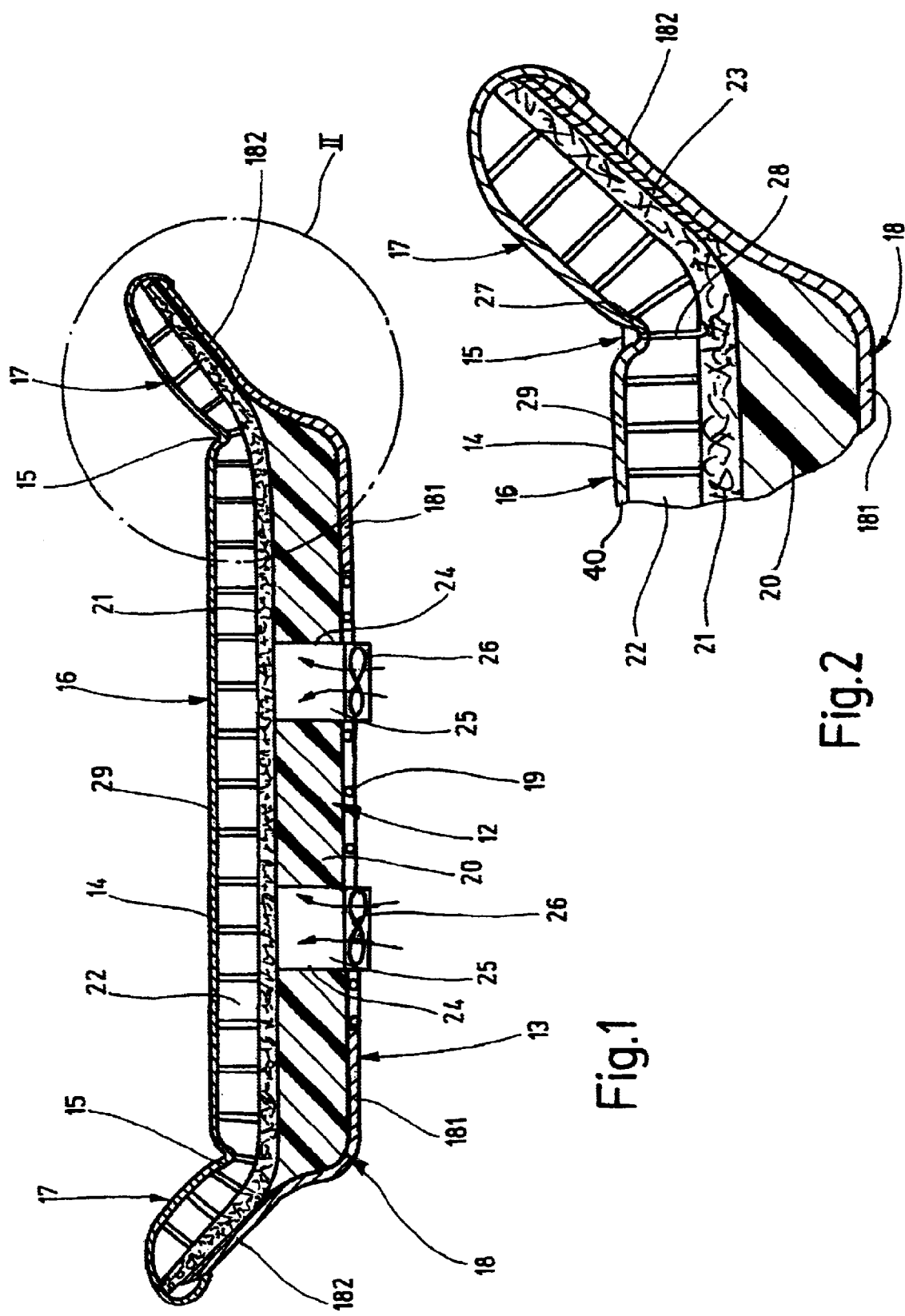

SEAT MODULE FOR A VEHICLE SEAT WHICH CAN BE ACTIVELY VENTILATED

BACKGROUND AND SUMMARY OF THE INVENTION

This application claims the priority of German Patent Document DE 100 24 879.9, filed in Germany, May 19, 2000, the disclosure of which is expressly incorporated by reference herein.

The invention relates to a seat module, which is intended for a vehicle seat, is designed as a seat cushion or backrest and can be actively ventilated. Preferred embodiments of the invention relate to a seat module comprising a cushion, which has a lower foam cushion layer impermeable to air, a central air-guiding layer made from a knitted spacing fabric and an air-permeable upper foam cushion layer and is covered with a cushion cover and divided by tacking that fixes the cushion cover into a face area and two side areas, which extend in the longitudinal direction and adjoin the latter, and having a cushion carrier that accommodates the cushion.

In the case of a known seat module of this kind (DE 196 28 698 C1, corresponding U.S. Pat. No. 5,902,014), which is designed as a seat cushion, the seat module is ventilated by arranging in the lower foam cushion layer resting on the cushion carrier, referred to as the cushion pad, a multiplicity of channels that penetrate the cushion pad vertically and in each of which a miniature fan is inserted. Each of the miniature fans is assigned to one area of the cushion separated off by tacking. The fans draw in air from the area of the vehicle's interior below the seat module and blow it into the air-guiding layer. In the knitted spacing fabric of the air-guiding layer, the air can spread out in all directions and, if the seat module is unoccupied, can flow out through the upper foam cushion layer and the cushion cover into the air space above the surface of the module and thereby effect rapid cooling of the surface of the module. If the seat module is occupied, the air flows along the air-guiding layer of the knitted spacing fabric and re-emerges at the open ends of the cushion. In the process, it produces an air-humidity gradient and carries away the air humidified by the seated person.

To reduce costs in the case of a likewise known seat module with active seat ventilation (DE 198 04 284 A1, corresponding U.S. Pat. No. 6,019.420), the air-guiding layer is composed of rubberized hair and rests as a cushion pad on the cushion carrier. An air-impermeable film or an air-impermeable foam layer is inserted between the cushion pad and the cushion carrier. The foam layer has at least one air inflow opening, at which a miniature fan is arranged below the foam layer. The air-guiding layer is covered by a cushion cover with a cover filling of wadding, non-woven wool or the like in between, into which it is also possible to insert a seat heating system.

In the case of a known seat module designed as a backrest (DE 197 45 521 A1, corresponding U.S. Pat. No. 6,206,465), the cushion is secured on a cushion carrier clamped in the frame of the backrest. The cushion is embodied with a face area and two bolster-type side areas. The face area and the side areas are formed in the cushion by means of so-called tacking channels. The cushion comprises a foam cushion pad that rests on the cushion carrier, an air-guiding layer comprising a coarse-mesh knitted spacing fabric that covers the entire surface of the cushion pad in the face area, an air-permeable pressure distribution layer composed of an open-cell foam resting on the air-guiding layer, and an air-permeable cushion cover that covers the surface of the cushion. To increase sitting comfort, the cushion is actively ventilated, ventilation being performed by miniature fans, which draw in air from the rear side of the cushion and force it through the air-guiding layer of the cushion, the air flowing out again via the cushion cover. For this purpose, each miniature fan is inserted into a bush that passes right through the cushion pad, extends as far as the air-guiding layer and is open on the rear side of the cushion pad. The ventilation in the bolster-type side areas is performed by means of separate fans since the tacking channels separate the air flow that enters the face area from the bulging areas at the edges.

An object on which the invention is based is, in the case of a seat module of the type stated at the outset, to improve the quality of the module as regards sitting comfort and long-term stability without having to make concessions in terms of manufacturing costs.

According to certain preferred embodiments of the invention, this object is achieved by providing a seat module intended for a vehicle seat and designed as a seat cushion or backrest which can be actively ventilated, comprising: a cushion, which has a lower foam cushion layer impermeable to air, a central air-guiding layer made from a knitted spacing-fabric and an air-permeable upper foam cushion layer, a cushion cover, tacking for the upper foam cushion layer fixing and dividing the cushion cover into a face area and two side areas which extend in a longitudinal direction and adjoin the face area, and a cushion carrier that accommodates the cushion, wherein the air-guiding layer rests on the lower foam cushion layer in the face area and directly on the cushion carrier in the side areas.

The seat module according to the invention has the advantage that the knitted spacing fabric of the air-guiding layer, the structure of which makes it very hard, is a long way away from the surface of the cushion and is no longer imprinted on the surface, this contributing to comfortable seating in terms of both look and feel. The elimination of the lower foam cushion layer in the side areas of the cushion means that this advantage is achieved in these areas too without making the side areas undesirably voluminous. At the same time, this makes the side areas more resistant to the pressure exerted by someone getting into the vehicle. The air-guiding layer remains stable and does not exhibit any settling, even in the long term, especially in the highly stressed face area, with the result that optimized ventilation of the seat module is maintained even in the long term. By virtue of the remoteness of the knitted spacing fabric from the surface of the cushion, rustling noises emanating from the knitted fabric are also damped by the foam layer and are barely audible, if at all.

Since the air blown into the air-guiding layer by means of fans can, so to speak, penetrate between the tacking, the side areas are well ventilated and do not require separate fans. By virtue of the support of the air-guiding layer made from knitted spacing fabric on a solid-foam block, on the one hand, the said block resting on a deep-drawn central portion of the cushion carrier in the face area, and on the lateral portions of the cushion carrier, on the other hand, these lateral portions being raised in the side areas, the air-guiding layer is in an optimum position that allows maximum air propagation in the air-guiding layer. Fans inserted into the lower foam layer thus have an increased pumping volume, with the result that it is possible either to improve conditioning comfort through more fresh air in the seat module or to reduce the number of fans, which makes the conditioning comfort more economical.

Advantageous embodiments of the seat module according to the invention together with expedient developments and refinements of the invention are described below and in the patent claims.

According to certain preferred embodiments of the invention, a noise-damping film is inserted between the air-guiding layer and the cushion carrier in the side areas. Noises that would otherwise be produced by the hard knitted fabric of the air-guiding layer rubbing on the cushion carrier are thereby largely suppressed.

According to an advantageous feature of certain preferred embodiments of the invention, tacking channels are arranged in the upper cushion layer of air-permeable foam to accommodate the tacking that fixes the cushion cover and divides the cushion into a face area and two side areas. As a result, the knitted spacing fabric of the air-guiding layer is not compressed in the area of the tacking and air can flow unhindered out of the face area into the side areas within the air-guiding layer, thus ensuring adequate ventilation of the side areas without additional fans.

According to an advantageous feature of certain preferred embodiments of the invention, the cushion carrier has raised side portions of a plastic or metal cushion shell at least in the side areas of the cushion, these side portions extending away obliquely upwards and, in the side areas, directly supporting the air-guiding layer composed of knitted spacing fabric together with the upper cushion layer of air-permeable foam that covers it.

According to an advantageous feature of certain preferred embodiments of the invention, the cushion carrier has a spring core, at least in a, preferably central, part of the face area, this spring core preferably extending over the entire face area. As a result, the lower foam cushion layer is not supported rigidly but is supported resiliently, ensuring that, despite the high compressive stress in the face area, the foam does not form a solid block and become hard, something that would considerably impair sitting comfort.

Other objects, advantages and novel features of the present invention will become apparent from the following detailed description of the invention when considered in conjunction with the accompanying drawings.

BRIEF DESCRIPTION OF THE DRAWINGS

FIG. 1 shows a cross section through a seat module designed as a seat cushion, constructed according to a preferred embodiment of the invention; and FIG. 2 shows an enlarged representation of the detail II in FIG. 1.

DETAILED DESCRIPTION OF THE DRAWINGS

The seat module shown in cross section in FIG. 1 is used as a seat cushion of a vehicle seat. The seat module has a cushion 12 that is covered with a cushion cover 14 and is secured on a cushion carrier 13. The cushion cover 14 is stretched over the cushion 12 by tacking 15, which divides the surface of the cushion into a face area 16 and two side areas 17, which adjoin the face area and extend in the longitudinal direction. In the case of a seat module used as a seat cushion, the side areas 17 are referred to as lateral cheeks and, in the case of a seat module designed as a backrest, as edge bolsters.

The cushion carrier 13 comprises a cushion shell 18 made of plastic or metal, which has a deep-drawn central shell portion 181 and lateral shell portions 182 that start at the upper edge of the shell portion 181 in the side areas 17 of the cushion 12 and extend away obliquely upwards. The cushion shell 18 is cut out over a large central part of the face area 16. The cutout is spanned by a spring core 19 hooked into the cushion shell 18.

The cushion 12 comprises an air-impermeable lower cushion layer 20 made of foam, which rests on the cushion carrier 13, a central air-guiding layer 21 composed of a relatively hard knitted spacing fabric, and an air-permeable upper cushion layer 22 made of foam, which is covered by the cushion cover 14 with a cover filling 29 of reticulated foam in between, possibly with a seat heating system 40 inserted into it. Within the face area 16, the cushion 12 rests by its lower cushion layer 20, referred to as the cushion pad, on the spring core 19 and on the deep-drawn central shell portion 181. The air-guiding layer 21 covers the lower cushion layer 20 and, in the side areas 17 of the cushion 12, rests directly on the lateral shell portions 182 that extend away obliquely upwards and outwards. To enhance comfort, a noise-damping film 23 is inserted between the shell portions 182 of the cushion shell 18 and the air-guiding layer 21.

The upper cushion layer 22 made of air-permeable foam covers the air-guiding layer 21 completely, i.e. both in the face area 16 and in the side areas 17. To make it permeable to air, the foam is perforated, as illustrated in FIG. 1. However, the air permeability can also be achieved by producing the upper cushion layer 22 from open-cell foam. The thickness of the lower cushion layer 20 is chosen in such a way that it fills the deep-drawn central shell portion 181 of the cushion shell 18 and the air-guiding layer 21 resting on the lower cushion layer 20 is transferred from the lower cushion layer 20 to the lateral shell portions 182 of the cushion shell 18 without any pronounced curvature or kink at the transition to the side areas 17 of the cushion 12. The air-guiding layer 21 is thus in an optimum position, which, on the one hand, is far enough away from the cushion surface to ensure that the knitted structure cannot imprint itself in the cushion surface and rustling noises caused by the knitted spacing fabric are to a large extent damped and which, on the other hand, ensures ventilation of the cushion right into the side areas 17 under optimum conditions.

Through channels 24 are arranged in the lower foam cushion layer 20 to allow active ventilation of the cushion 12. Inserted into each channel 24 is a bush 25 that extends as far as the air-guiding layer 21, projects somewhat from the underside of the lower cushion layer 20 and contains a miniature fan 26. The air drawn in by the miniature fans 26 from below the seat module is blown into the air-guiding layer 21 and there spreads out via the face area 16 into the side areas 17 of the cushion 12 and can flow off via the air-permeable upper cushion layer 22 and the air-permeable cushion cover 14 at the surface of the seat module. For the tacking 15 of the cushion cover 14 at the transition between the face area 16 and the side areas 17, tacking seams 27 (FIG. 2) are provided in the upper cushion layer 20 and, to pretension the cushion cover 14, tacking hooks 28 are inserted into these seams at a distance from one another and tensioned, pulling the cushion cover 14 into the tacking channels 27 in the upper cushion layer 22. By virtue of this type of tacking 15, the cross section of the air-guiding layer 21 leading through under the tacking 15 is not constricted and ventilation of the side areas 17 is not impaired.

The invention is not restricted to the described exemplary embodiment of the seat module designed as a seat cushion. The seat module can also be embodied with the same structure as a backrest.

The cushion carrier 13 can be designed as a complete cushion shell 18, with the result that the lower cushion layer 20 rests on the cushion shell 18 over its entire area. Conversely, a spring core 19 can be stretched across the entire face area 16, with the result that the lower cushion layer 20 rests fully on a spring core 19.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A seat module intended for a vehicle seat and designed as one of a seat cushion and backrest which can be actively ventilated, said seat module comprising:
   a cushion having a lower foam cushion layer impermeable to air, a central air-guiding layer made from a knitted spacing fabric and an air-permeable upper foam cushion layer,
   a cushion cover,
   tacking for the upper foam cushion layer fixing and dividing the cushion cover into a face area and two side areas which extend in a longitudinal direction and adjoin the face area, and
   a cushion carrier that accommodates the cushion,
   wherein the air-guiding layer rests on the lower foam cushion layer in the face area and directly on the cushion carrier in the side areas.

2. The seat module according to claim 1,
   wherein a noise-damping film is inserted between the air-guiding layer and the cushion carrier in the side areas of the cushion.

3. The seat module according to claim 2,
   wherein tacking channels for the tacking of the cushion cover are arranged in the upper foam cushion layer.

4. The seat module according to claim 2,
   wherein through channels are arranged in the lower foam cushion layer, and wherein an open-ended bush, which extends as far as the air-guiding layer and in which a miniature fan is arranged, is inserted in each of said channels.

5. The seat module according to claim 1,
   wherein tacking channels for the tacking of the cushion cover are arranged in the upper foam cushion layer.

6. The seat module according to claim 5,
   wherein through channels are arranged in the lower foam cushion layer, and wherein an open-ended bush, which extends as far as the air-guiding layer and in which a miniature fan is arranged, is inserted in each of said channels.

7. The seat module according to claim 1,
   wherein at least in the side areas of the cushion, the cushion carrier has rigid portions of a cushion shell that extend away obliquely upwards and outwards.

8. The seat module according to claim 7,
   wherein the cushion carrier is designed as an integral cushion shell, composing at least one of plastic and metal.

9. The seat module according to claim 7,
   wherein through channels are arranged in the lower foam cushion layer, and wherein an open-ended bush, which extends as far as the air-guiding layer and in which a miniature fan is arranged, is inserted in each of said channels.

10. The seat module according to claim 7,
    wherein the cushion carrier has a spring core at least in a central part of the face area.

11. The seat module according to claim 1,
    wherein at least in the side areas of the cushion, the cushion carrier has rigid portions of a cushion shell that extend away obliquely upwards and outwards.

12. The seat module according to claim 11,
    wherein the spring core extends over the entire face area of the cushion.

13. The seat module according to claim 11,
    wherein the cushion carrier is designed as an integral cushion shell, composing at least one of plastic and metal.

14. The seat module according to claim 1,
    wherein at least in the side areas of the cushion, the cushion carrier has rigid portions of a cushion shell that extend away obliquely upwards and outwards.

15. The seat module according to claim 14,
    wherein the cushion carrier is designed as an integral cushion shell, composing at least one of plastic and metal.

16. The seat module according to claim 1,
    wherein at least in the side areas of the cushion, the cushion carrier has rigid portions of a cushion shell that extend away obliquely upwards and outwards.

17. The seat module according to claim 16,
    wherein the cushion carrier is designed as an integral cushion shell, composing at least one of plastic and metal.

18. The seat module according to claim 1,
    wherein through channels are arranged in the lower foam cushion layer, and wherein an open-ended bush, which extends as far as the air-guiding layer and in which a miniature fan is arranged, is inserted in each of said channels.

19. The seat module according to claim 1,
    wherein to achieve the air permeability the foam of the upper cushion layer is at least one of perforated and open-cell design.

20. The seat module according to claim 1, wherein the seat module is designed as a seat cushion with said side areas forming lateral cheeks.

21. The seat module according to claim 1,
    wherein a cover filling comprising reticulated foam is arranged between the upper foam cushion layer and the cushion cover.

22. The seat module according to claim 21, comprising a seat heating system arranged between the upper foam cushion layer and the cushion cover.

23. The seat module according to claim 1, wherein the seat module is designed as a seat backrest with said side areas forming edge bolsters.

* * * * *